(12) United States Patent
Marrotte

(10) Patent No.: US 11,516,116 B2
(45) Date of Patent: Nov. 29, 2022

(54) DOMAIN NAME SYSTEM MULTIPATHING DISTRIBUTED APPLICATIONS

(71) Applicant: EMC IP Holding Company LLC, Hopkinton, MA (US)

(72) Inventor: Michael Marrotte, Windermere, FL (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 4 days.

(21) Appl. No.: 16/834,257

(22) Filed: Mar. 30, 2020

(65) Prior Publication Data

US 2021/0306254 A1 Sep. 30, 2021

(51) Int. Cl.
*H04L 45/24* (2022.01)
*H04L 67/1023* (2022.01)
*H04L 61/4511* (2022.01)
*H04L 45/42* (2022.01)

(52) U.S. Cl.
CPC .............. *H04L 45/24* (2013.01); *H04L 45/42* (2013.01); *H04L 61/4511* (2022.05); *H04L 67/1023* (2013.01)

(58) Field of Classification Search
None
See application file for complete search history.

(56) References Cited

U.S. PATENT DOCUMENTS

| | | | | |
|---|---|---|---|---|
| 8,612,627 B1* | 12/2013 | Brandwine | ........... | H04L 1/0057 709/240 |
| 8,683,075 B1* | 3/2014 | Joffe | ..................... | H04L 67/101 709/238 |
| 10,630,579 B1* | 4/2020 | Plenderleith | ........ | H04L 45/7453 |
| 2005/0188073 A1* | 8/2005 | Nakamichi | ........... | H04L 67/327 709/223 |
| 2014/0330964 A1* | 11/2014 | Previdi | ............... | H04L 67/1002 709/224 |
| 2015/0109907 A1* | 4/2015 | Akiya | ................... | H04L 45/507 370/229 |
| 2015/0237155 A1* | 8/2015 | Power | ................. | H04L 67/2814 709/219 |
| 2017/0230308 A1* | 8/2017 | Horman | .................. | H04L 47/72 |
| 2018/0337894 A1* | 11/2018 | Subbarayan | ............ | H04L 41/50 |
| 2020/0007441 A1* | 1/2020 | Pani | ......................... | H04L 41/22 |
| 2020/0007448 A1* | 1/2020 | Mizrahi | ................ | H04L 47/125 |

(Continued)

*Primary Examiner* — Joshua Joo
(74) *Attorney, Agent, or Firm* — Amin, Turocy & Watson, LLP

(57) ABSTRACT

Techniques are provided for domain name system multipathing distributed applications. In an example, a client computer queries a multipath-aware domain name system service with a domain name for a plurality of application servers, where there are a plurality of network paths available between the client computer and the application servers. The multipath-aware domain name system service can select a network path to be used, then determine a server that leads to that network path being used (by determining a hash used in network routing for each server of the plurality of servers). The multipath-aware domain name system service can respond to the client computer with an IP address for a selected application server, which results in communications between the client computer and the selected application server occurring over the selected network path.

20 Claims, 12 Drawing Sheets

(56) References Cited

U.S. PATENT DOCUMENTS

2020/0213186 A1* 7/2020 Shaw .................. H04L 49/50
2020/0404084 A1* 12/2020 Huddleston ............ H04L 43/06
2021/0119904 A1* 4/2021 Yu .................. H04L 43/0835

* cited by examiner

DOMAIN NAME SYSTEM MULTIPATHING DISTRIBUTED APPLICATIONS

TECHNICAL FIELD

The present application relates generally to routing computer communications across a computer network.

BACKGROUND

A domain name system (DNS) can serve as a directory service to translate domain names to Internet Protocol (IP) addresses for computers that are attempting to communicate with each other across a communications network. A computer that receives from a DNS an IP address for a computer that it wishes to connect to can then have communications with this other computer routed across a communications network in a variety of ways.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
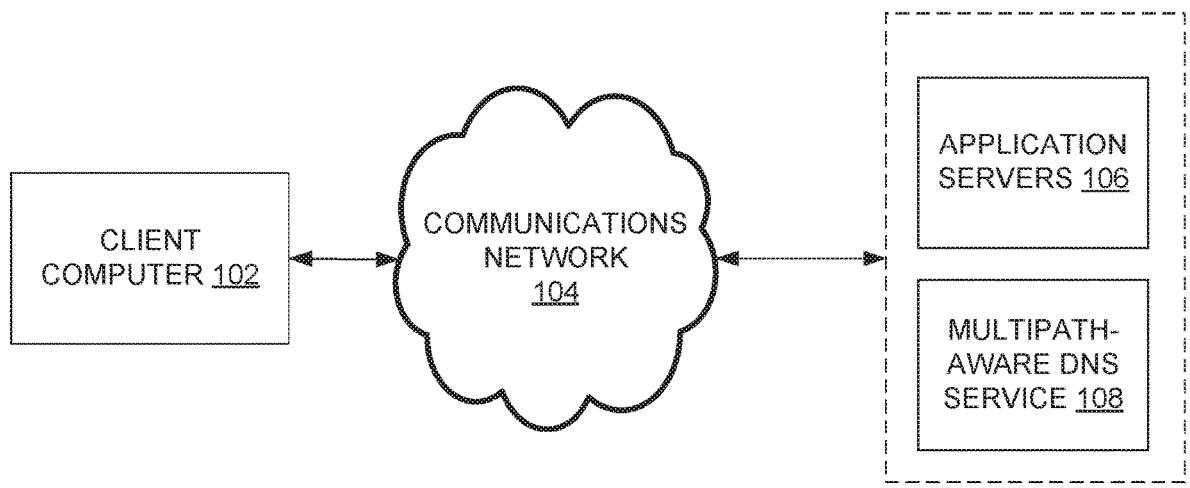
FIG. 1 illustrates an example system architecture that can facilitate DNS multipathing distributed applications, in accordance with certain embodiments of this disclosure.

Enterprise data centers and cloud providers can use LAGs and ECMPs as techniques to keep up with the network bandwidth requirements of high-bandwidth workloads. Generally, a LAG comprises combining, or aggregating, multiple network connections in parallel. A LAG can comprise combining multiple physical ports to form one data path. Then, traffic along a LAG can be distributed among the multiple physical ports of the LAG. This distribution of traffic among the multiple physical ports can be considered to be a form of load balancing. There can be other terms used to describe a LAG, such as port trunking, or channel bonding.

Then, with ECMP, routing metric determinations can be made, and where there is determined to be multiple "best paths" or "equal costs" of the multiple paths between a source computer and a target computer, traffic can be divided among these multiple equal cost paths. As with a LAG, ECMP can be used to load balance network traffic across multiple network paths. In some examples, LAG and ECMP techniques can be combined to route network traffic among multiple network paths.

On their own, LAG and ECMP techniques are not deterministic. That is, they do not assure that a particular network path is taken between a source computer and a target computer. Furthermore, on their own, LAG and ECMP techniques do not guarantee an optimal use of bandwidth, and can lead to problems such as an imbalanced network path distribution, network congestion, and underutilized bandwidth.

As described herein, DNS multipathing can overcome these problems with LAG and ECMP techniques. DNS multipathing can comprise techniques used to coordinate multipath network techniques with DNS load balancing to achieve deterministic control over distributed application traffic flows, and achieve better bandwidth utilization across multipath networks.

Some computer networks use LAGs and ECMPs as techniques for scaling network capacity. Hash-based techniques can be used for load balancing traffic among multiple available paths with in a LAG or ECMP group. In using a hash-based technique, three inputs can be utilized, the protocol that the network communications will use, an IP address for the source computer that is originating the communications, and an IP address for a target computer that will receive the communications from the source computer.

Among other things, a hash technique can scramble an output relative to an input, so that to different inputs that are similar can produce two outputs that are much more different. These three values (protocol, source IP address, and target IP address) can be hashed, module-N, where N represents a number of paths in the LAG or ECMP group. Then, this resulting value can represent which path of the LAG or ECMP group to use for the network traffic.

An advantage of a hash-based technique for load distribution can be the preservation of a packet sequence for a given flow of network packets, and real-time distribution without maintaining a per-flow state in a router. A disadvantage of a hash-based technique can be that it can result in an imbalance of a load on individual component links, leading to congestion and underutilized bandwidth.

DNS load balancing then can comprise configuring a domain in the DNS such that client, or source, requests to the domain can be distributed across a group of application servers, or targets, without regard to the underlying network or LAG or ECMP groups. DNS load balancers can utilize a variety of server-oriented techniques to balance traffic among available application servers, including round robin (where new connections are assigned to application servers in equal proportion, and in turn), least connections (where a new connection is assigned to an application server that has a least number of active connections), lightest load (where a new connection is assigned to an application server that has a lightest load of processing resources), and random (where a new connection is randomly assigned to one of the application servers).

However, previous DNS load balancing techniques do not attempt to steer or balance traffic across LAGs and ECMP groups. DNS multipathing (sometimes referred to as "DNSm") does attempt to steer or balance traffic across LAGs and ECMP groups. DNS multipathing can accomplish this traffic steering or balancing by mapping client request to application servers such that the client-server traffic then flows over DNS-application-chosen LAG and/or ECMP paths. This can be called "steer-by-mapping."

In performing steer-by-mapping, a DNS server can use the LAG or ECMP hash function (or both), the N number of paths in the LAG or ECMP group, the protocol being used in the communications between the source and target, the source IP address, and the target IP address. In some examples, with this information, the DNS service can determine what target IP address will lead to communications between the source and the target to proceed over a selected network path. So, by selecting a target IP address that leads to a particular network path being used, the DNS service can deterministically control distributed application flows, and distribute the flows across the LAG and/or ECMP groups in such a way as to improve network bandwidth utilization.

Example Architectures

FIG. 1 illustrates an example system architecture 100 that can facilitate DNS multipathing distributed applications, in accordance with certain embodiments of this disclosure. As depicted, system architecture 100 comprises client computer 102, communications network 104, application servers 106, and multipath-aware DNS 108. Each of client computer 102, application servers 106, and multipath-aware DNS 108 can be implemented with aspects of one or more instances of computer 1202 of FIG. 12. Communications network 104 can comprise a computer communications network, such as the INTERNET, or an isolated private computer communications network. With a Dynamic Host Configuration Protocol (DHCP), a DHCP server can instruct client 102 which DNS service (here, multipath-aware DNS 108) to use. In other examples, client 102 can be instructed to use a non-multipath-aware DNS service that is configured to forward relevant zones to a multipath-aware DNS service, or client 102 can be manually configured with the address of a DNS service.

Application servers 106 can comprise multiple individual application servers, each of which can comprise a separate computer server that can serve client computer 102 with a web application, and each of which can be accessed by one or more distinct IP addresses. Client computer 102 can initially send a request to multipath-aware DNS 108 (or to a DNS service that forwards the request to a multipath-aware DNS service) that contains a fully-qualified domain name for application servers 106 (e.g. nfs.dell.com), and which is sent via communications network 104. In turn multipath-aware DNS 108 can select a specific application server of application servers 106, and respond to client 102 with an IP address for that selected application server.

These communications between client computer 102 and multipath-aware DNS 108 can comprise a DNS request sent from client computer 102 to multipath-aware DNS 108, and a DNS response sent from multipath-aware DNS 108 to client computer 102.

There can be multiple paths across communications network 104 that communications between client computer 102 and application servers 106 can take, such as via LAGs or ECMP groups. Then, the specific path that communications between client computer 102 and a specific application server of application servers 106 can be determined based on applying the hashing technique used in the LAG and/or ECMP group that will indicate the path to take. So, multipath-aware DNS 108 can ensure that the communications for client computer 102 take place on a particular path by selecting a specific application server of application servers 106 that will lead to that specific path being taken in the LAG and/or ECMP group.

Multipath-aware DNS 108 can know the hash technique being used by the LAG and/or ECMP group, and use that to determine what server will cause what path to be used, then select a server that will cause a specific path to be used. Multipath-aware DNS 108 can respond to client computer 102 with an IP address for a particular application server of application servers 106. So, by sending the IP address for a particular application server, but otherwise not instructing client 102 on which path to use, client 102 can still end up using the path selected by Multipath-aware DNS.

Figure 2:
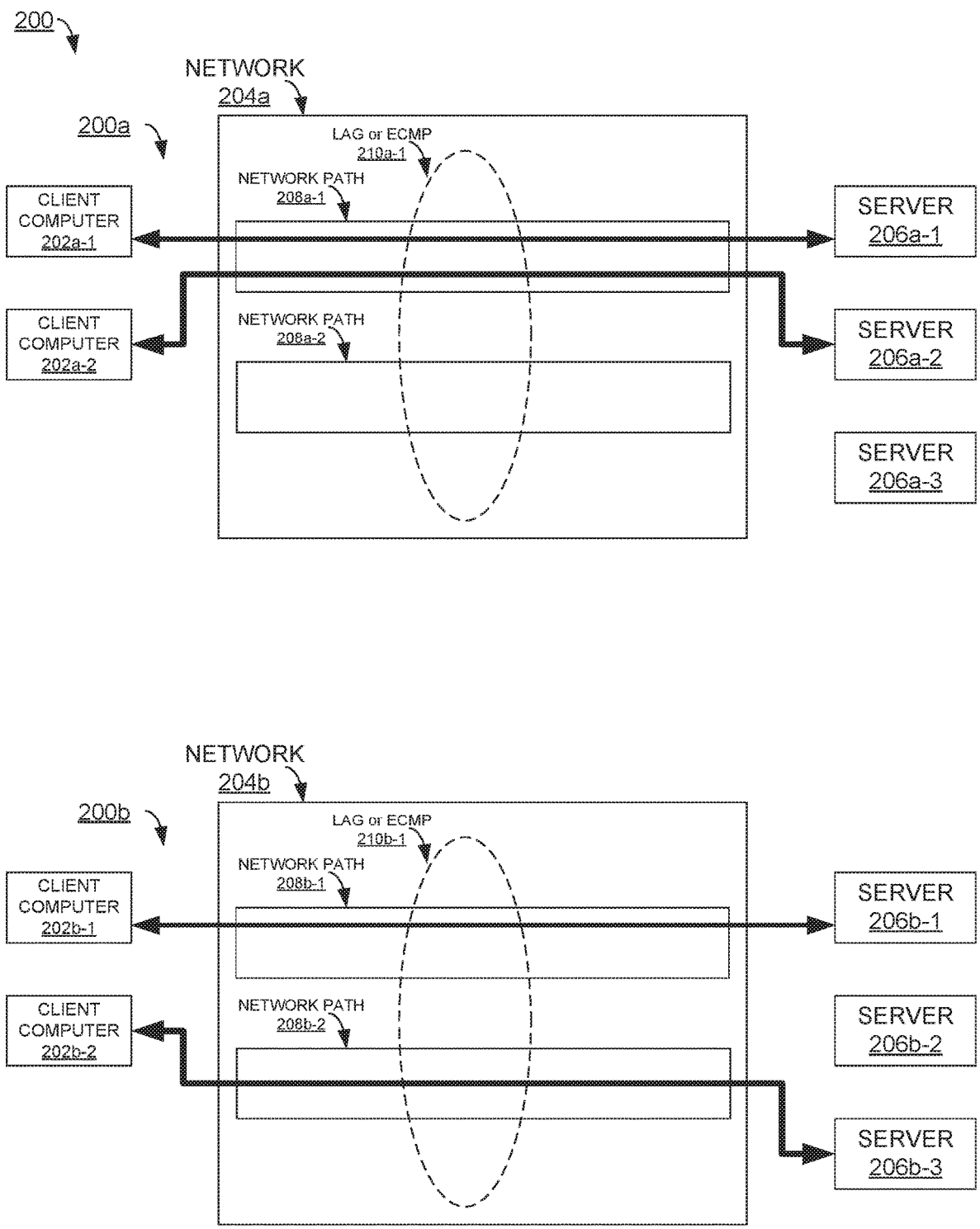
FIG. 2 illustrates an example system architecture that can facilitate DNS multipathing distributed applications with either link aggregation groups (LAGs) or equal-cost multipaths (ECMPs), in accordance with certain embodiments of this disclosure.

FIG. 2 illustrates an example system architecture 200 that can facilitate DNS multipathing distributed applications with either link aggregation groups (LAGs) or equal-cost multipaths (ECMPs), in accordance with certain embodiments of this disclosure. Example system architecture 200 comprises system architecture 200a, where DNS multipathing is not utilized, and system architecture 200b, where DNS multipathing is utilized.

System architecture 200a comprises client computer 202a-1, client computer 202a-2, communications network 204a, server 206a-1, server 206a-2, and server 206a-3. Each of client computer 202a-1, client computer 202a-2, server 206a-1, server 206a-2, and server 206a-3 can be implemented with aspects of one or more instances of computer 1202 of FIG. 12. Additionally, each of client computer 202a-1 and client computer 202a-2 can be similar to client computer 102 of FIG. 1. Each of server 206a-1, server 206a-2, and server 206a-3 can be similar to individual application servers of application servers 106 of FIG. 1. Communications network 204 can be similar to communications network 104 of FIG. 1.

Turning to system architecture 200b, it comprises client computer 202b-1, client computer 202b-2, communications network 204b, server 206b-1, server 206b-2, and server 206b-3. Each of client computer 202b-1, client computer 202b-2, server 206b-1, server 206b-2, and server 206b-3 can be implemented with aspects of one or more instances of computer 1202 of FIG. 12. Additionally, each of client computer 202b-1 and client computer 202b-2 can be similar to client computer 102 of FIG. 1. Each of server 206b-1, server 206*b*-2, and server 206*b*-3 can be similar to individual application servers of application servers 106 of FIG. 1. Communications network 204 can be similar to communications network 104 of FIG. 1.

In system architecture 200*a*, a DNS service implements a round robin approach of assigning client connections to servers. That is, clients are assigned to servers without regard to the network path those communications take. Client computer 202*a*-1 requests to access an application server assigns it to server 206*a*-1. Then, client computer 202*a*-2 requests access to an application server, and the DNS service assigns it to server 206*a*-2—the next server in a list of server 206*a*-1, server 206*a*-2, and server 206*a*-3. Where subsequent client requests to access a server were requested, the DNS service could continue cycling through this list of servers—assigning a third request to server 206*a*-3, assigning a fourth request to server 206*a*-1, assigning a fifth request to server 206*a*-2, and so on.

What a DNS service does not do in system architecture 200*a* is distribute these connections among the multiple paths of network 204*a*. Network 204*a* comprises two paths between the client computers and the servers—network path 208*a*-1 and network path 208*a*-2. These two paths (network path 208*a*-1 and network path 208*a*-2) can comprise a LAG or a ECMP group 210*a*-1. For a given client and protocol (where client IP address, protocol, and target IP address are used to determine which of multiple paths to use), the target IP address can determine the network path used. But in the round robin approach of system architecture 200*a*, no consideration of which path will follow from which server assignment is made.

Rather, servers are assigned in a round robin approach, without regard to the resulting network path. This round robin approach can then lead to the case illustrated in system architecture 200*a*. That is, both communications (the communication between client computer 202*a*-1 and server 206*a*-1, and the communication between client computer 202*a*-2 and server 206*a*-2) are made across network path 208*a*-1, when network path 208*a*-2 remains unused. So, there might not be enough bandwidth for both communications on network path 208*a*-1, and this can be an inefficient allocation of bandwidth resources.

In contrast, in system architecture 200*b*, a multipath-aware DNS service (such as multipath-aware DNS 108 of FIG. 1) does strive to spread communications across the multiple paths available in network 204*b*. That is, the communication between client computer 202*b*-1 and server 206*b*-1 takes place across network path 208*b*-1, and then the communication between client computer 202*b*-2 and server 206*b*-3 takes place across network path 208*b*-2. Network path 208*b*-1 and network path 208*b*-2 can be part of LAG or ECMP group 210*b*-1.

A multipath-aware DNS service can first determine which network path to use for a communication. In this case, where network path 208*b*-1 is already used by the communication between client computer 202*b*-1 and server 206*b*-1, a multipath-aware DNS service can determine to use network path 208*b*-2 for a new communication originated by client computer 202*b*-2. Then, once the network path is selected, a multipath-aware DNS service can find a server (one of server 206*b*-1, server 206*b*-2, and server 206*b*-3) that causes network path 208*b*-2 to be used.

A multipath-aware DNS service can perform the same hash used by the LAG or ECMP group of network 204*b* to find which server results in network path 208*b*-2 being used. That is, a multipath-aware DNS service can perform a hashes on inputs comprising an IP address of client computer 202*b*-2, a protocol to be used in the communication (as specified by client computer 202*b*-2), and then cycle through the IP addresses of server 206*b*-1, server 206*b*-2, and server 206*b*-3 until it finds a particular server that leads to a hash being determined that indicates to use network path 208*b*-2.

Here, a multipath-aware DNS service determines that server 206*b*-3 leads to a hash being determined that indicates to use network path 208*b*-2. So, client 202*b*-2 is shown as using network path 208*b*-2 to communicate with server 206*b*-3.

Figure 3:
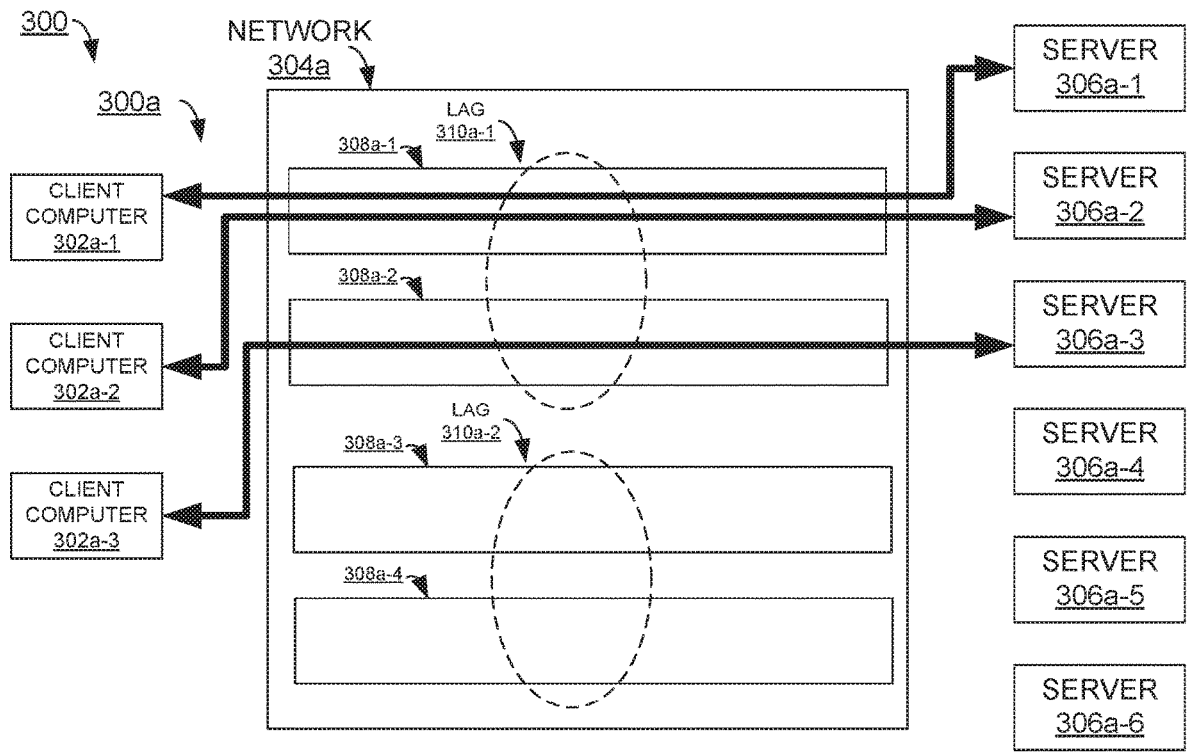
FIG. 3 illustrates an example system architecture that can facilitate DNS multipathing distributed applications with either link aggregation groups (LAGs) or equal-cost multipaths (ECMPs), in accordance with certain embodiments of this disclosure.
Figure 3:
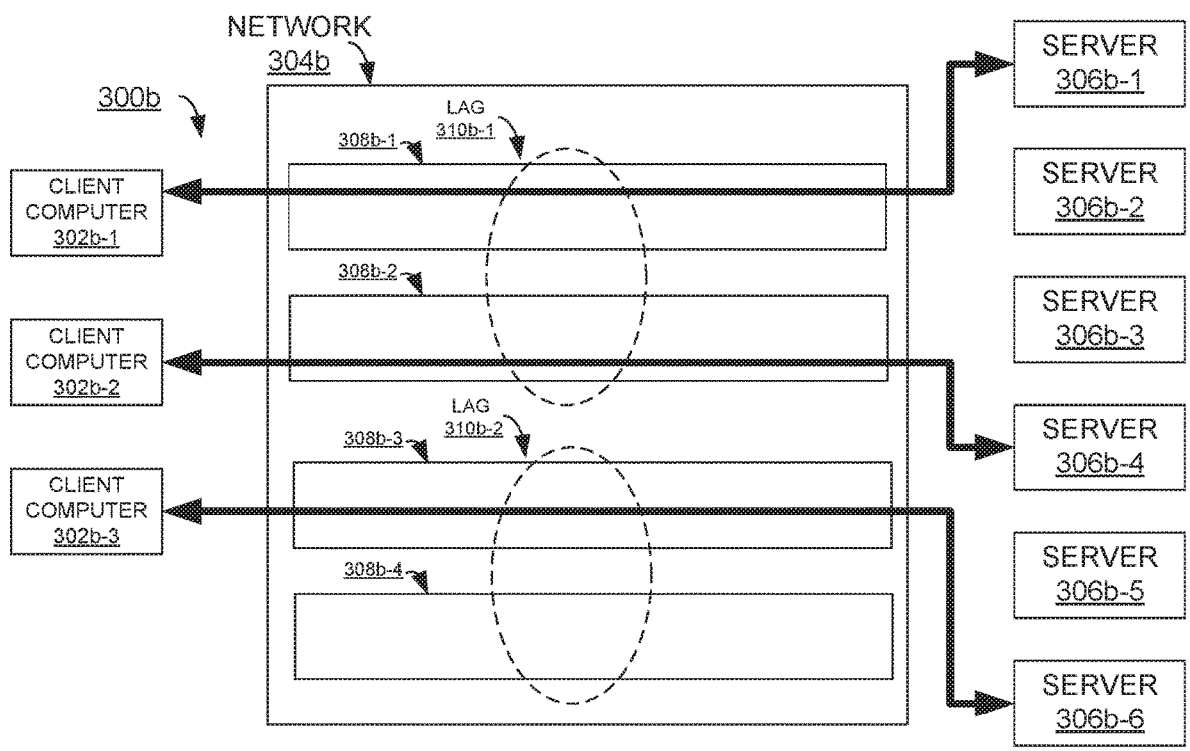

FIG. 3 illustrates an example system architecture 300 that can facilitate DNS multipathing distributed applications with either link aggregation groups (LAGs) or equal-cost multipaths (ECMPs), in accordance with certain embodiments of this disclosure. Example system architecture 300 comprises system architecture 300*a*, where DNS multipathing is not utilized, and system architecture 300*b*, where DNS multipathing is utilized.

System architecture 300*a* comprises client computer 302*a*-1, client computer 302*a*-2, client computer 302*a*-3, communications network 304*a*, server 306*a*-1, server 306*a*-2, server 306*a*-3, server 306*a*-5, server 306*a*-5, and server 306*a*-6. Each of client computer 302*a*-1, client computer 302*a*-2, computer 302*a*-3, server 306*a*-1, server 306*a*-2, server 306*a*-3, server 306*a*-4, server 306*a*-5, and server 306*a*-6 can be implemented with aspects of one or more instances of computer 1202 of FIG. 12. Additionally, each of client computer 302*a*-1, client computer 302*a*-2, and client computer 302*a*-3 can be similar to client computer 102 of FIG. 1. Each of server 306*a*-1, server 306*a*-2, server 306*a*-3, 306*a*-4, server 306*a*-5, and server 306*a*-6 can be similar to individual application servers of application servers 106 of FIG. 1. Network 304*a* can comprise four network paths—network path 308*a*-1, network path 308*a*-2, network path 308*a*-3, and network path 308*a*-4. These four network paths can make up an ECMP group, and two LAGs—LAG 310*a*-1 comprising network path 308*a*-1 and network path 308*a*-2, and LAG 310*a*-2 comprising network path 308*a*-3 and network path 308*a*-4.

That is, each LAG (LAG 310*a*-1 and LAG 310*a*-2) can be an ECMP member of the ECMP group. In examples that utilize both ECMP groups and LAGs, ECMP selection can be performed first, and then LAG selection. In such examples, ECMP selection can comprise determining to utilize the ECMP member comprising LAG 310*a*-1. Then, after ECMP selection, LAG selection can comprise selecting either network path 308*a*-1 and network path 308*a*-2 from LAG 310*a*-1.

Given the combination of ECMP group and LAGs, when routing decisions are made in system architecture 300*a* two hashes can be used—one hash to determine which ECMP to use (the LAG 310*a*-1 of network path 308*a*-1 and network path 308*a*-2, or the LAG 310*a*-1 of network path 308*a*-3 and network path 308*a*-4), and a second hash to determine which path within a LAG to use (e.g., if the LAG 310*a*-1 of network path 308*a*-1 and network path 308*a*-2 is selected, then a hash is used to determine whether to use network path 308*a*-1 or network path 308*a*-2 within LAG 310*a*-1).

Similar to system architecture 200*a*, in system architecture 300*a*, a DNS service implements a round robin approach of assigning client connections to servers. That is, clients are assigned to servers without regard to the network path those communications take. Client computer 302*a*-1 requests to access an application server assigns it to server 306*a*-1. Then, client computer 302*a*-2 requests access to an application server, and the DNS service assigns it to server 306*a*-2—the next server in a list of server 206*a*-1, server 206a-2, server 206a-3, server 206a-4, server 206a-5, and server 206a-6. Then, client computer 302a-3 requests access to an application server, and the DNS service assigns it to server 306a-3—the next server in the list of servers.

As with system architecture 200a, this round robin approach to DNS results in some network paths being overutilized while other network paths are underutilized. As can be seen, two connections use path 308a-1 (the connection between client computer 302a-1 and server 306a-1, and the connection between client computer 302a-2 and server 306a-2), and all three connections use LAG 310a-1 (the aforementioned connection between client computer 302a-1 and server 306a-1 and connection between client computer 302a-2 and server 306a-2, and the connection between client computer 302a-3 and server 306a-3 that uses network path 308a-2). Then, the bandwidth of LAG 310a-2 (and its network paths, network path 308a-3 and network path 308a-4) remains unutilized.

In contrast to system architecture 300a where network bandwidth is not efficiently utilized, in system architecture 300b, DNS multipathing is implemented for more-efficient network bandwidth utilization.

System architecture 300b comprises client computer 302b-1, client computer 302b-2, client computer 302b-3, communications network 304b, server 306b-1, server 306b-2, server 306b-3, server 306b-5, server 306b-5, and server 306b-6. Each of client computer 302b-1, client computer 302b-2, computer 302b-3, server 306b-1, server 306b-2, server 306b-3, server 306b-4, server 306b-5, and server 306b-6 can be implemented with aspects of one or more instances of computer 1202 of FIG. 12. Additionally, each of client computer 302b-1, client computer 302b-2, and client computer 302b-3 can be similar to client computer 102 of FIG. 1. Each of server 306b-1, server 306b-2, server 306b-3, 306b-4, server 306b-5, and server 306b-6 can be similar to individual application servers of application servers 106 of FIG. 1. Network 304b can comprise four network paths—network path 308b-1, network path 308b-2, network path 308b-3, and network path 308b-4. These four network paths can make up an ECMP group, and two LAGs—LAG 310b-1 comprising network path 308b-1 and network path 308b-2, and LAG 310b-2 comprising network path 308b-3 and network path 308b-4.

As with system architecture 300a, given the combination of ECMP group and LAGs, when routing decisions are made in system architecture 300b two hashes can be used—one hash to determine which ECMP to use (the LAG 310b-1 of network path 308b-1 and network path 308b-2, or the LAG 310b-1 of network path 308b-3 and network path 308b-4), and a second hash to determine which path within a LAG to use (e.g., if the LAG 310b-1 of network path 308b-1 and network path 308b-2 is selected, then a hash is used to determine whether to use network path 308b-1 or network path 308b-2 within LAG 310b-1).

Similar to system architecture 200b of FIG. 2, in system architecture 300b, a multipath-aware DNS service implements DNS multipathing to assign client connections to servers. When a client computer makes a request to access a web application, the DNS service can select a network path between the client computer and the application servers that has available bandwidth. Then, the DNS service can determine which server will lead to the selected network path being used, by trying server IP addresses with both hashes until those hashes indicate the selected path. Once this appropriate server has been determined the DNS service can respond to a DNS query from the client computer with the target IP address of the selected server.

Using this DNS multipath approach, and in contrast to system architecture 200a, in system architecture 200b, the network bandwidth of network 304b is more efficiently utilized. As can be seen, client computer 1 302b-1 connects to server 306b-1 across network path 308b-1. Client computer 302b-2 connects to server 306b-4 across network path 308b-2. Client computer 302b-3 connects to server 306b-6 across network path 308b-3. There is no overlap here of any of the three network connections sharing the same network path. In some examples, where a fourth connection is made, a multipath-aware DNS service can identify a server for which network path 308b-4 will be used for the resulting communication.

Example Process Flows

Figure 4:
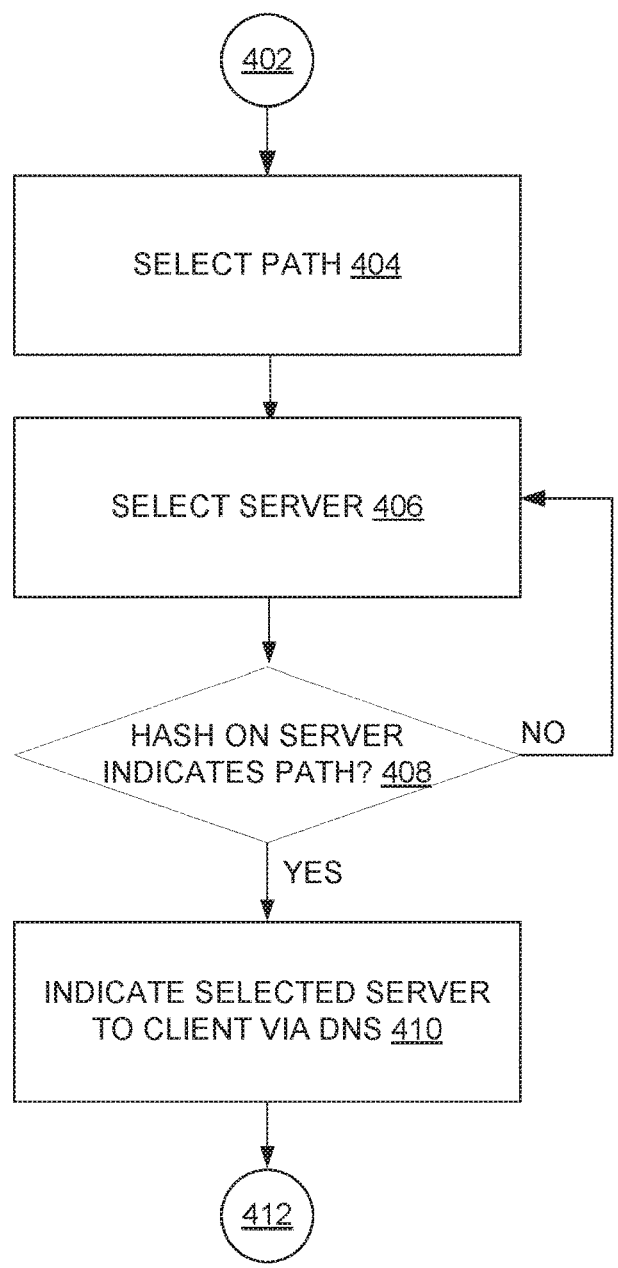
FIG. 4 illustrates an example process flow that can facilitate DNS multipathing distributed applications with either LAGs or ECMPs, in accordance with certain embodiments of this disclosure.

FIG. 4 illustrates an example process flow 500 that can facilitate DNS multipathing distributed applications with either LAGs or ECMPs, in accordance with certain embodiments of this disclosure. In some examples, aspects of process flow 400 can be implemented by computing environment 1200 of FIG. 12. In some examples, aspects of process flow 400 can be used to implement aspects of multipath-aware DNS 108 of FIG. 1.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 400 begins with 402, and moves to operation 404. Operation 404 depicts selecting a path. In some examples, multiple network paths can be known to a DNS service, and various approaches can be implemented to distribute connections across these multiple network paths. For example, a round robin approach can be taken, where each path is selected in turn, and once each path has been selected once, then each path is selected a second time in turn, and so on. In operation 404, a path can be selected as the path that will be used for this communication. This can be viewed in contrast to operation 406, where a server is selected to see if it corresponds to the path, but in some examples, the particular server used is not the concern—just that that server leads to using the selected path. In other examples, the specific server used can be a concern, such as with load balancing among the servers. After operation 404, process flow 400 moves to operation 406.

Operation 406 is reached from operation 404, or from operation 408 where it is determined that the hash on the server does not indicate the path. Operation 406 depicts selecting a server. In some examples, a list of servers of the application servers can be maintained, and the DNS service can select the first one from the list that has not been analyzed in this instance of implementing process flow 400. In this example of process flow 400, the focus is on assigning the communication to a specific network path (in operation 404), and then the matter of identifying a server 406 is about identifying a server that will lead to the communications occurring on that selected network path. After operation 406, process flow 400 moves to operation 408.

Operation 408 depicts determining whether a hash on the server indicates the path. This hash can be the LAG-or-ECMP hash of process flow 600 of FIG. 6, or the LAG-hash-and-ECMP-hash of process flow 700 of FIG. 7. This hash can be used in implementing LAG or ECMP on a network to make routing decisions for a particular communication between two computers. Where a DNS service knows what hash or hashes are used, then the DNS service can select an application server that will cause a particular network path to be selected. In that way, the DNS service can implement deterministic network path selection via its selection of a particular server.

Where in operation 408 it is determined that the hash on the server indicates the path, process flow 400 moves to operation 410. Instead, where in operation 408 it is determined that the hash on the server does not indicate the path, process flow 400 returns to operation 406. In this manner, operation 406 and operation 408 can serve as a loop where a server that will lead to the client using the selected path is identified.

Operation 410 is reached from operation 408 where it is determined that the hash on the server indicates the path. Operation 410 depicts indicating the selected server to the client computer using DNS. This can comprise a DNS service sending a DNS response to the client computer, where the DNS response indicates an IP address of the selected server. For example, a DNS response can comprise the following:

```
;; ANSWER SECTION:
nfs.dell.com   59 IN A   192.0.2.0
```

This section of a DNS response comprises a name, a time to live (TTL), a class, a type, and rdata. The name here is nfs.dell.com and indicates the domain name of the application servers that the client requested to access. The TTL here is 59, and indicates a time (in seconds) that the response is valid for. The class here is IN, which indicates that the record is of the Internet. The type here is A, which indicates that the IP address in this response is an IPv4 address. The rdata here is 192.0.2.0, an IP address that nfs.dell.com resolves to, and that corresponds to the selected server.

The client can then access the application via the application server at 192.0.2.0, and while doing so, will use the network path selected in operation 404. Note that, in this example, the DNS service does not tell the client what network path to use. Rather, the DNS service knows that the client computer will use the selected network path when it accesses the IP address that the DNS service tells the client computer to access. After operation 410, process flow 400 moves to 412, where process flow 400 ends.

Figure 5:
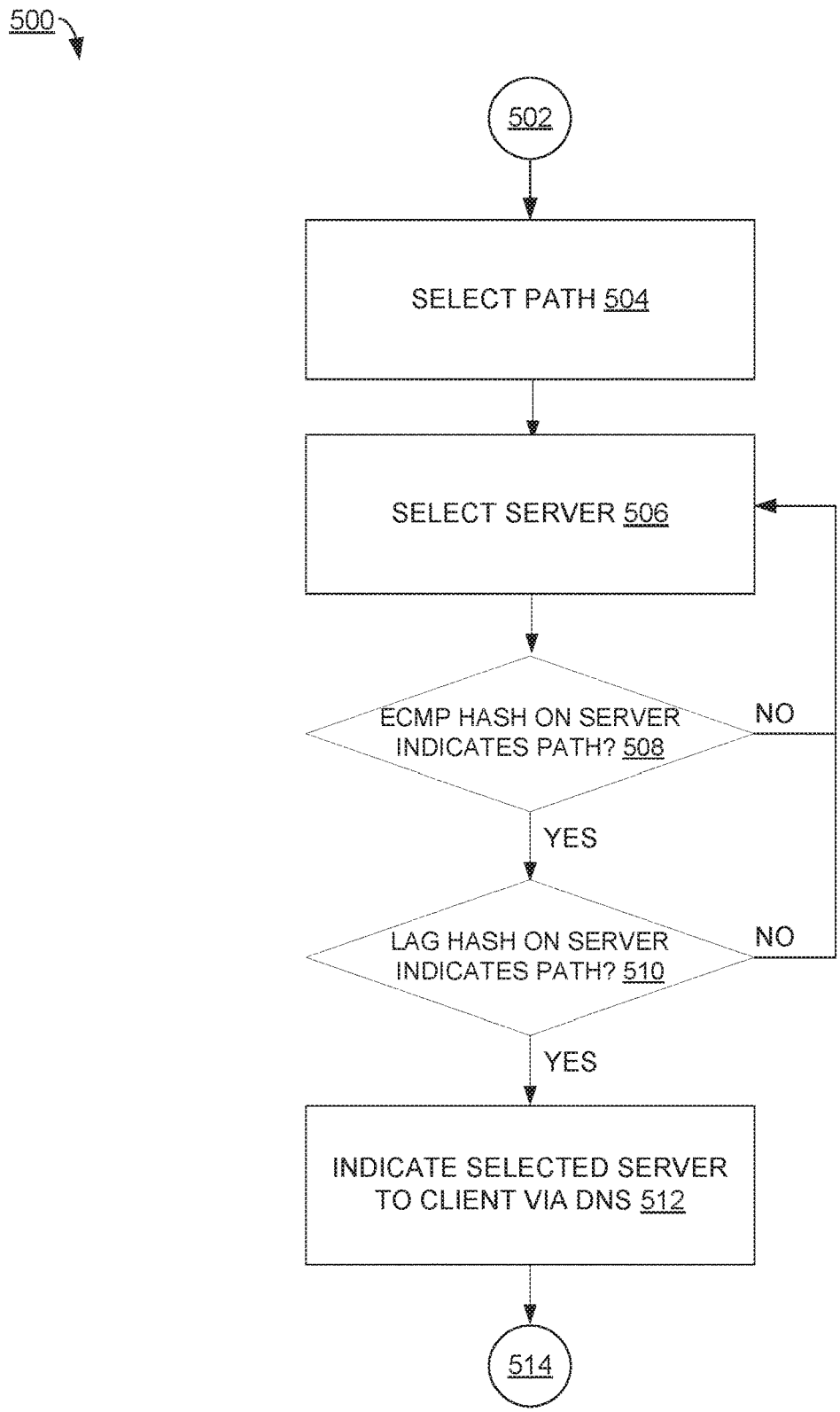
FIG. 5 illustrates an example process flow that can facilitate DNS multipathing distributed applications with both LAGs and ECMPs, in accordance with certain embodiments of this disclosure.

FIG. 5 illustrates an example process flow 500 that can facilitate DNS multipathing distributed applications with both LAGs and ECMPs, in accordance with certain embodiments of this disclosure. In some examples, aspects of process flow 500 can be implemented by computing environment 1200 of FIG. 12. In some examples, aspects of process flow 500 can be used to implement aspects of multipath-aware DNS 108 of FIG. 1.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 400 of FIG. 4, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 500 begins with 502, and moves to operation 504. Operation 504 depicts selecting a path. In some examples, operation 504 can be implemented in a similar manner as operation 404 of FIG. 4. After operation 504, process flow 500 moves to operation 506.

Operation 506 is reached from operation 504, from operation 508 where it is determined that the ECMP hash on the server does not indicate the path, or from operation 510 where it is determined that the LAG hash on the server does not indicate the path. Operation 506 depicts selecting a server. In some examples, operation 506 can be implemented in a similar manner as operation 406 of FIG. 4. After operation 506, process flow 500 moves to operation 508.

Operation 508 depicts determining whether a ECMP hash on the server indicates the path. In some examples, operation 508 can be implemented in a similar manner as operation 408 of FIG. 4. Where in operation 508 it is determined that the ECMP hash on the server indicates the path, process flow 500 moves to operation 510. Instead, where in operation 508 it is determined that the hash on the server does not indicate the path, process flow 500 returns to operation 506.

Operation 510 is reached from operation 508 where it is determined that the ECMP hash on the server indicates the path. Operation 510 depicts determining whether a LAG hash on the server indicates the path. In some examples, operation 508 can be implemented in a similar manner as operation 408 of FIG. 4. It can be that there are two separate hashes used in process flow 500 (though the same hash approach can be used both times). In examples where both ECMP groups and LAGs are used, one hash can be used for selecting a ECMP member within a ECMP (where the ECMP member can be a LAG group when both ECMP groups and LAGs are used), and another hash can be used for selecting a network path within a LAG group. So, in process flow 500, one hash can be determined in operation 508 for a ECMP group, and another hash can be determined in operation 510 for an LAG.

Where in operation 510 it is determined that the LAG hash on the server indicates the path, process flow 500 moves to operation 512. Instead, where in operation 510 it is determined that the LAG hash on the server does not indicate the path, process flow 500 returns to operation 506. In this manner, operation 506, operation 508, and operation 510 can serve as a loop where a server that will lead to the client using the selected path is identified.

Operation 512 is reached from operation 510 where it is determined that the LAG hash on the server (and the ECMP hash on the server, in operation 508) indicates the path. Operation 512 depicts indicating the selected server to the client computer using DNS. In some examples, operation 512 can be implemented in a similar manner as operation 410 of FIG. 4. After operation 510, process flow 500 moves to 512, where process flow 500 ends.

Figure 6:
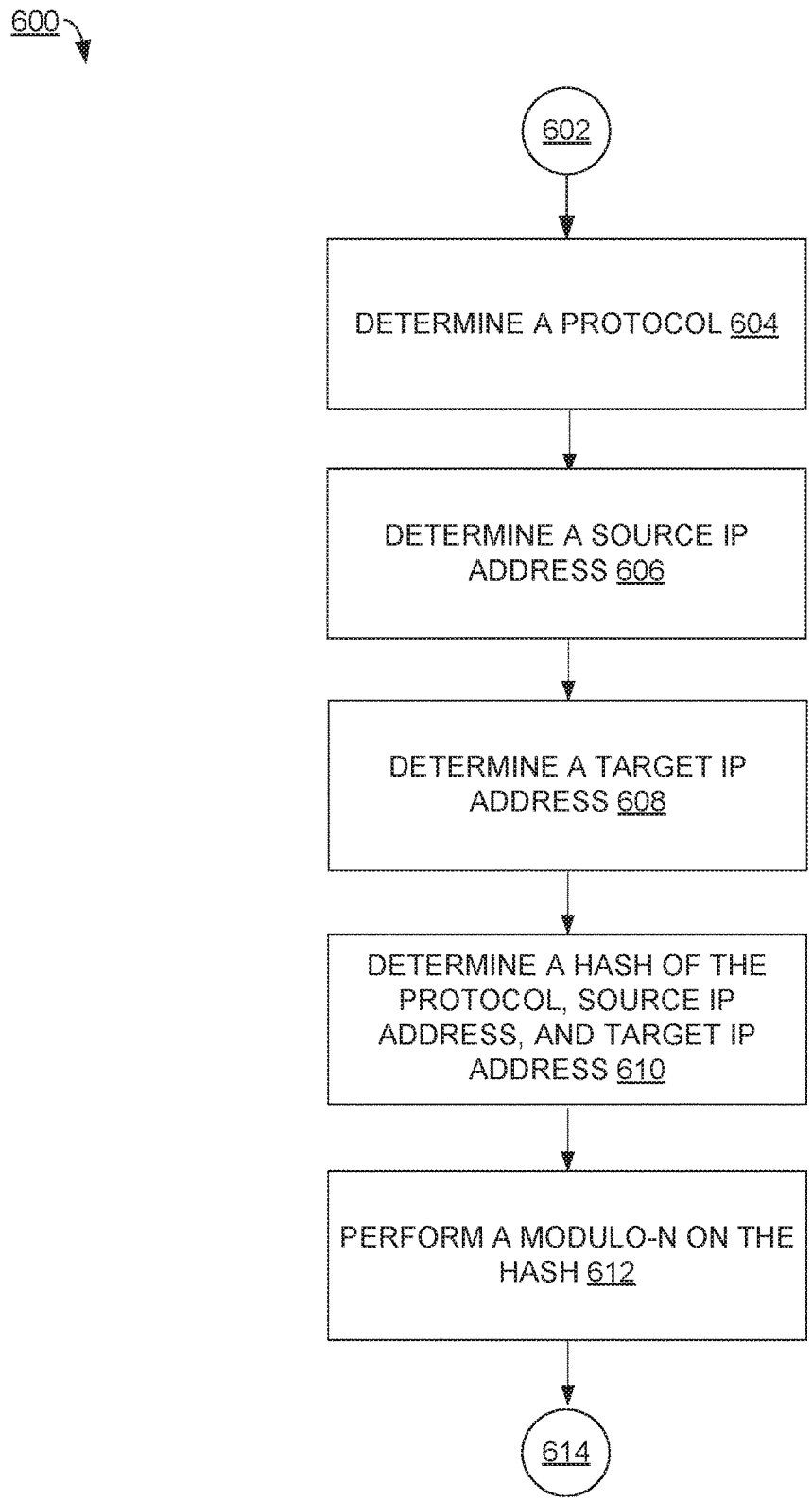
FIG. 6 illustrates an example process flow for hashing a 3-tuple of a communications request that can facilitate DNS multipathing distributed applications, in accordance with certain embodiments of this disclosure.

FIG. 6 illustrates an example process flow 600 for hashing a 3-tuple of a communications request that can facilitate DNS multipathing distributed applications, in accordance with certain embodiments of this disclosure. In some examples, aspects of process flow 600 can be implemented by computing environment 1200 of FIG. 12. In some examples, aspects of process flow 600 can be used to implement aspects of multipath-aware DNS 108 of FIG. 1, or to implement operation 408 of FIG. 4, operation 508 and/or operation 508 of FIG. 5, which generally depict hashing.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 400 of FIG. 4, process flow 500 of FIG. 5, process flow 700 of FIG. 7, process flow 800 of FIG. 8, process flow 900 of FIG. 9, process flow 1000 of FIG. 10, and process flow 1100 of FIG. 11.

Process flow 600 begins with 602, and moves to operation 604. Operation 604 depicts determining a protocol. This can be a network communications protocol to be used in network communications between a client computer making the DNS request and an intended server to connect to. In some examples, the protocol is identified in a fully-qualified domain name that the client computer sends to a DNS service as part of a request for a server IP address. That is, a fully qualified domain name for an application server can be nfs.dell.com, which indicates that a Network File System (NFS) protocol will be used for the communications. In other examples, a fully qualified domain name for an application server can be smb.dell.com, which indicates that a Server Message Block (SMB) protocol will be used for the communications.

In some examples, a client computer that makes a request to a DNS service indicates the domain name that it is querying for a corresponding IP address without indicating the type of protocol that the computer intends to use in communicating with a computer corresponding to that IP address. By setting application servers with a fully qualified domain name that indicates the protocol, this protocol information can be transmitted by the client computer within the fully qualified domain name when making the DNS request.

In some examples, a DNS request otherwise omits a protocol. That is, a packet that a client sends to a DNS service to request an IP address can otherwise not indicate what protocol the client will use for communicating with the server. After operation 604, process flow 600 moves to operation 606.

Operation 606 depicts determining a source IP address. A source IP address can be an IP address of a client computer that is making the DNS request, e.g., an IP address of client computer 102 of FIG. 1. In some examples, a source IP address can be conveyed in a DNS request that the client computer sends to a DNS service (e.g., multipath-aware DNS 108 of FIG. 1). After operation 606, process flow 600 moves to operation 608.

Operation 608 depicts determining a target IP address. In some examples, the client computer sends a DNS request that includes a fully qualified domain name for an application server. The DNS service can maintain a database of pairs that comprise fully qualified domain names and corresponding IP addresses. In such examples, the DNS service can determine the target IP address by querying this database with the corresponding fully qualified domain name After operation 608, process flow 600 moves to operation 610.

Operation 610 depicts determining a hash of the protocol, source IP address, and target IP address. The protocol can be that which is determined in operation 604. The source IP address can be that which is determined in operation 606. The destination IP address can be that which is determined in operation 608. The hash on these values in operation 610 can be any of a variety of hashes. An example of a hash is a message-digest algorithm (MD5) hash.

In general, a hash can take three inputs and produce a wildly disparate output, so two similar input values will produce quite different output values. So, hashing a set of {NFS, 192.0.2.0, 192.0.2.1} will generally produce quite a different output from hashing the similar set of {NFS, 192.0.2.0, 192.0.2.2}. After operation 610, process flow 600 moves to operation 612.

Operation 612 depicts performing a modulo-N on the hash. In general, in modular approaches, a set of output values is restricted to a certain range, and the input "wraps around" once a certain value is reached. For example, 8 mod 4 (where N=4) can result in a value of 4, while 3 mod 4 can result in a value of 3. In operation 612, N can be set to a number of network paths for a connection, so that a possibly-large hash output in operation 610 is mapped to the set of possible network paths. This resulting value of operation 612 can indicate which network path to use.

After operation 612, process flow 600 moves to 614, where process flow 600 ends.

Figure 7:
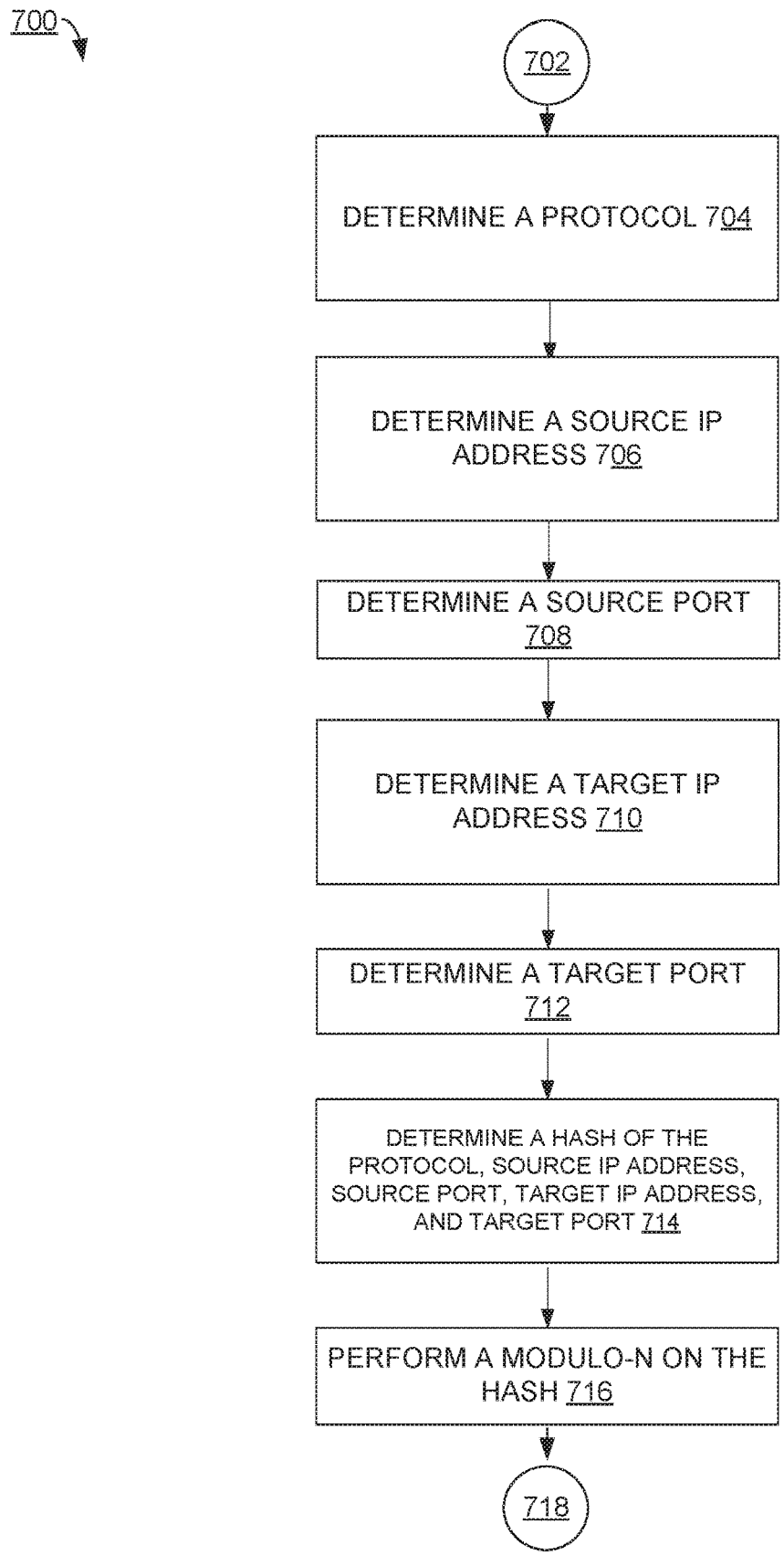
FIG. 7 illustrates an example process flow for hashing a 5-tuple of a communications request that can facilitate DNS multipathing distributed applications, in accordance with certain embodiments of this disclosure.

FIG. 7 illustrates an example process flow 700 for hashing a 5-tuple of a communications request that can facilitate DNS multipathing distributed applications, in accordance with certain embodiments of this disclosure. In some examples, aspects of process flow 700 can be implemented by computing environment 1200 of FIG. 12. In some examples, aspects of process flow 700 can be used to implement aspects of multipath-aware DNS 108 of FIG. 1, or to implement operation 408 of FIG. 4, operation 508 and/or operation 508 of FIG. 5, which generally depict hashing.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 400 of FIG. 4, process flow 500 of FIG. 5, process flow 600 of FIG. 6, process flow 800 of FIG. 8, process flow 900 of FIG. 9, process flow 1000 of FIG. 10, and process flow 1100 of FIG. 11.

Process flow 700 begins with 702, and moves to operation 704. Operation 704 depicts determining a protocol. In some examples, operation 704 can be implemented in a similar manner as operation 604 of FIG. 6. After operation 704, process flow 700 moves to operation 706.

Operation 706 depicts determining a source IP address. In some examples, operation 706 can be implemented in a similar manner as operation 606 of FIG. 6. After operation 706, process flow 700 moves to operation 708.

Operation 708 depicts determining a source port. This source port can be a network port that the client computer (the same client computer as with the source IP address in operation 706) will use for network communications with the application server for which it is requesting an IP address. In some examples, the port used for a particular communication can be manually set for the client computer, and known by the multipath-aware DNS service. After operation 708, process flow 700 moves to operation 710.

Operation 710 depicts determining a target IP address. In some examples, In some examples, operation 710 can be implemented in a similar manner as operation 608 of FIG. 6. After operation 710, process flow 700 moves to operation 712.

Operation 712 depicts determining a target port. This target port can be a network port that the server (the same client computer as with the target IP address in operation 706) will use for network communications with the client computer that has made the DNS request. A target port can be pre-determined based on a protocol being used. For example, Hyper Text Transfer Protocol (HTTP) can use port 80. Where a non-standard port is used (e.g., HTTP on port 81), a DNS service can determine this target port information. So, by determining a protocol in operation 704 using a fully qualified domain name, a DNS service can also determine the target port using this determined protocol or fully qualified domain name After operation 712, process flow 700 moves to operation 714.

Operation 714 depicts determining a hash of the protocol, source IP address, source port, target IP address, and target port. In some examples, operation 714 can be implemented in a similar manner as operation 610 of FIG. 6, but with the protocol, source IP address, source port, target IP address, and target port as inputs to the hash. After operation 710, process flow 700 moves to operation 712.

Operation 716 depicts performing a modulo-N on the hash. In some examples, In some examples, operation 710 can be implemented in a similar manner as operation 608 of FIG. 6. After operation 716, process flow 700 moves to 718, where process flow 700 ends.

Figure 8:
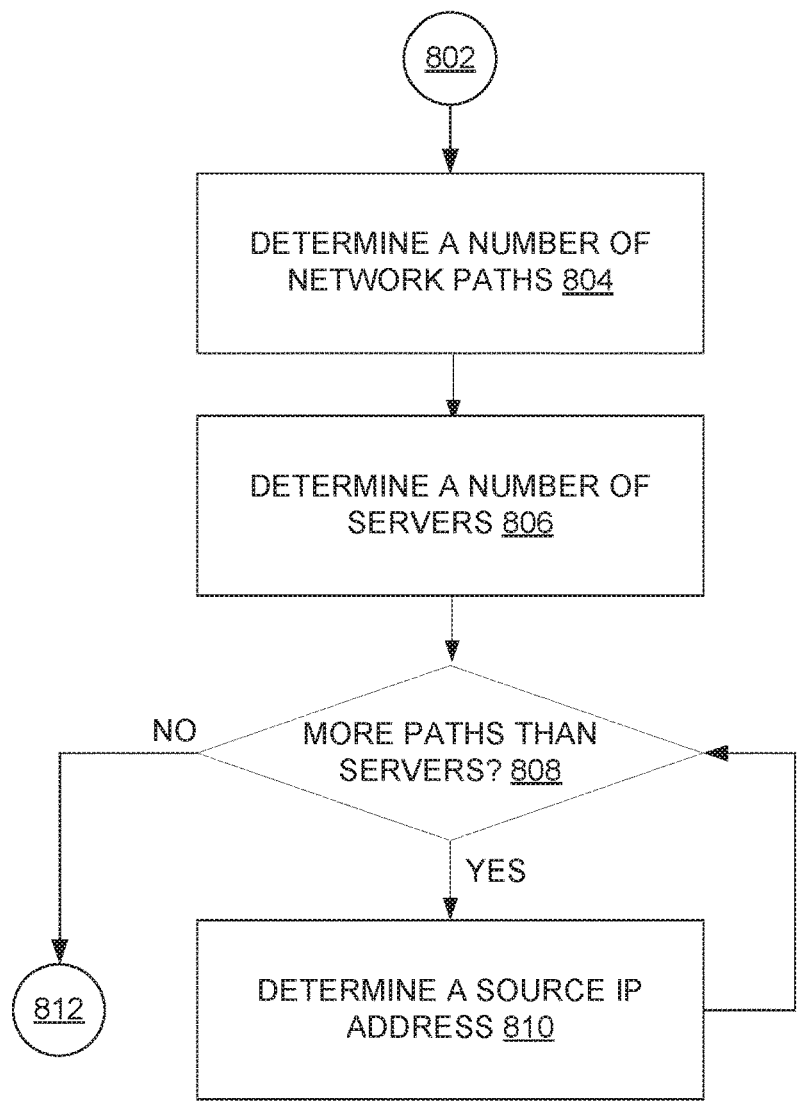
FIG. 8 illustrates an example process flow that can facilitate DNS multipathing distributed applications where there are more network paths than servers, in accordance with certain embodiments of this disclosure.

FIG. 8 illustrates an example process flow 800 that can facilitate DNS multipathing distributed applications where there are more network paths than servers, in accordance with certain embodiments of this disclosure. In some examples, aspects of process flow 800 can be implemented by computing environment 1200 of FIG. 12. In some examples, aspects of process flow 800 can be used to implement aspects of multipath-aware DNS 108 of FIG. 1.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 400 of FIG. 4, process flow 500 of FIG. 5, process flow 600 of FIG. 6, process flow 700 of FIG. 7, process flow 900 of FIG. 9, process flow 1000 of FIG. 10, and process flow 1100 of FIG. 11.

Process flow 800 begins with 802, and moves to operation 804. Operation 804 depicts determining a number of network paths. This number of network paths (e.g., network path 308*b*-1, network path 308*b*-2, network path 308*b*-3, and network path 308*b*-4 of FIG. 3) can be a number of network paths between a client computer and a set of application servers. In some examples, a DNS service can query the network topology to determine a number of network paths. In other examples, a DNS service can receive user input indicating a number of network paths. After operation 804, process flow 800 moves to operation 806.

Operation 806 depicts determining a number of servers. This can be a number of servers of a set of application servers, such as server 306*b*-1, server 306*b*-2, server 306*b*-3, server 306*b*-4, server 306*b*-5, and server 306*b*-6 of FIG. 3. In some examples, operation 806 can comprise determining a number of individual servers. In other examples, operation 806 comprises determining a number of network connections of the servers. One server can have more than one network connection.

In examples, a server having multiple network connections, or IP addresses, can be accomplished via IP aliasing, where multiple IP addresses are assigned to a single network interface of a server. In other examples, one server having multiple network connections can be accomplished by assigning multiple IP addresses to a server where it has multiple network interfaces (e.g., multiple network interface cards). In some examples, a DNS service can assign additional IP addresses to an application server as desired. After operation 806, process flow 800 moves to operation 808.

Operation 808 is reached from operation 806 or from operation 810. Operation 808 depicts determining whether there are more network paths than servers. The number of network paths can be determined in operation 804. The number of servers (or network connections to servers) can be the number of servers determined in operation 806 where operation 808 is reached from operation 806.

Where operation 808 is reached from operation 810, the number of servers can be the new number of servers after IP aliasing or assigning another IP address is performed in operation 810. This number of network connections from operation 804 and servers from operation 806 or operation 810 can be compared.

Where it is determined in operation 808 that there are more network paths than servers, process flow 800 moves to operation 810. Instead, where it is determined in operation 808 that there are not more network paths than servers, process flow 800 moves to 812, where process flow ends.

Operation 810 is reached from operation 808 where it is determined that there are more network paths than servers. Operation 810 depicts performing IP aliasing for a server, or assigning another IP address for a server. In IP aliasing, multiple network addresses can be assigned to one network interface of a server. In other examples, additional IP addresses can be assigned to a server, such as by assigning a second IP address to a second network interface of a server. Loops of operation 808 and operation 810 can be performed to perform additional IP aliasing or assigning additional IP addresses to servers until there are at least as many servers (or IP addresses for servers) as network paths.

Figure 9:
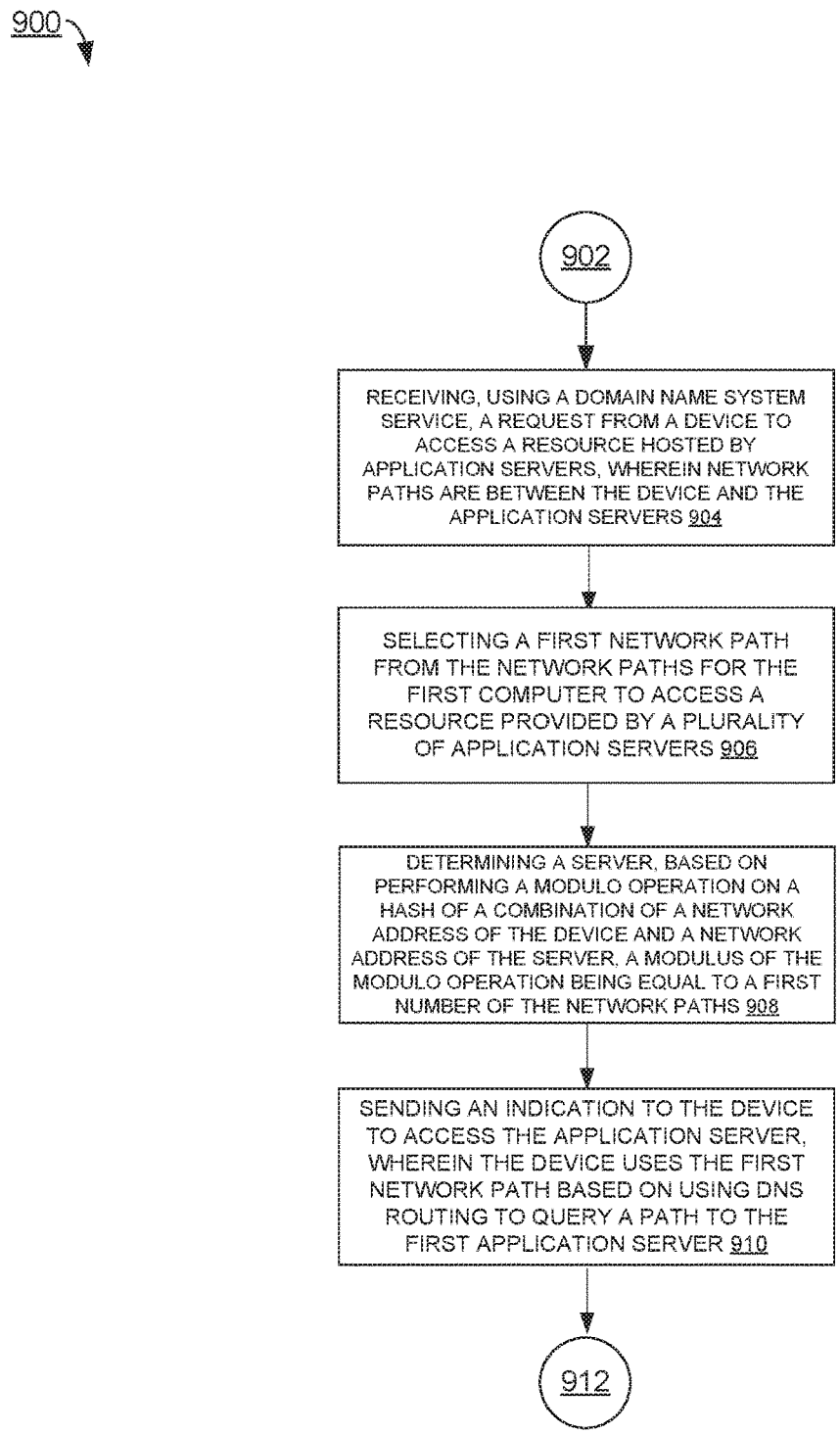
FIG. 9 illustrates an example process flow that can facilitate DNS multipathing distributed applications, in accordance with certain embodiments of this disclosure.

FIG. 9 illustrates an example process flow 900 that can facilitate DNS multipathing distributed applications, in accordance with certain embodiments of this disclosure. In some examples, aspects of process flow 900 can be implemented by computing environment 1200 of FIG. 12. In some examples, aspects of process flow 900 can be used to implement aspects of multipath-aware DNS 108 of FIG. 1.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1000 of FIG. 10, and process flow 1100 of FIG. 11.

Process flow 900 begins with 902, and moves to operation 904. Operation 904 depicts receiving, using a domain name system service, a request from a device to access a resource hosted by application servers, wherein network paths are between the device and the application servers. In some examples, the domain name service can be multipath-aware DNS of FIG. 1, the device can be client computer 102, the application servers can be application servers 106, and the network paths can be network paths of communications network 104. The request to access the resource can comprise a DNS request that provides a fully qualified domain name of the application servers, and for which the DNS service responds with an IP address for a selected one of the application servers.

In some examples, the network paths comprise a link aggregation group. In some examples, the network paths comprise an equal-cost multi-path routing group. In some examples, the network paths comprise a combination of a link aggregation group and an equal-cost multi-path routing group.

In some examples, each network path of the network paths communicatively couples the computer and the application server. That is, each of the plurality of network paths can be a possible route between a client computer and an application server.

After operation 904, process flow 900 moves to operation 906.

Operation 906 depicts selecting a first network path from the network paths for the first computer to access a resource provided by a plurality of application servers. Using the example of FIG. 3, the plurality of network paths can comprise network path 308b-1, network path 308b-2, network path 308b-3, and network path 308b-4. A multipath-aware DNS service can load balance across these network paths by selecting a network path for this communication by the device to use. In an example, the multipath-aware DNS service can use a round robin policy of selecting network paths (to be distinguished from a round robin policy of selecting servers in system architecture 200a of FIG. 2 and system architecture 200b of FIG. 2). In some examples, the determining the first network path from the plurality of network paths between the first computer and the plurality of application servers is performed based on load balancing among the plurality of application servers. That is, these determinations can be made to load balance among a plurality of network paths.

After operation 906, process flow 900 moves to operation 908.

Operation 908 depicts determining a first application server of the plurality of application servers, for which the first computer will use the first network path to access the first application server, based on a result of performing a modulo operation on a hash of a combination of a first network address of the device and a second network address of the application server, a modulus of the modulo operation being equal to a first number of the network paths.

Having selected the network path, this can comprise determining which server of the plurality of servers leads to this network path being used. In some examples, there can be multiple servers that lead to one particular network path being used. A hash used to determine a network path for a connection (such as described in process flow 600 of FIG. 6 or process flow 700 of FIG. 7) can be performed with the server IP addresses as inputs to the hash until an output of the hash (and the corresponding modulo) is found that indicates the selected network path.

In some examples, the hash comprises a message-digest hash, or a secure hash algorithm hash. In some examples, the hash is determined prior to the receiving the request from the device. That is, hashes for combinations of clients, servers, and protocols can be pre-computed by a multipath-aware DNS service. Then, when a client makes a DNS request, the multipath-aware DNS service can search or query these precomputed hashes to determine which server correspond to a selected path rather than determining these hashes on the fly at the time of the request. In other examples, the hash is determined in response to the receiving the request from the device. That is, the hash can be determined upon receiving a DNS request from a client computer.

In some examples, the hash further comprises a combination of a communications protocol to be used between the device and the application server. That is, the protocol that will be used between the client and server can be used as part of determining which network path will be used for that connection. In some examples, the communications protocol is indicated in a fully qualified domain name of the group of application servers that is indicated by the device. That is, the fully qualified domain name nfs.dell.com can indicate that a NFS protocol will be used for communications between the client and the server because the text "nfs" appears in the fully qualified domain name.

In some examples, the hash comprises a hashing approach utilized by a domain name system in indicating to the first computer which route to take to access the first application server. That is, the hash is used by the network to determine a path from a client computer to an application server, and a multipath-aware DNS service can use this hashing approach to determine what the network will do for routing.

In some examples, the hash further comprises a combination of a first network port of the device for communication between the device and the application server, and a second network port of the application server for communication between the device and the application server. That is, in some examples, input to the hash can comprise a 3-tuple of the protocol being used for the communications, the source IP address, and the target IP address. In other examples, input to the hash can comprise a 5-tuple of the protocol being used for the communications, the source IP address, the source port, the target IP address, and the target port.

In some examples, operation 908 can comprise determining the application server of the application servers for the computer to use to connect to the application server, based on an output resulting from load balancing among the application servers. That is, in addition to load balancing among a plurality of network connections, a multipath-aware DNS service can also load balance among a plurality of application servers. In some examples, a multipath-aware DNS service can perform multipath load balancing, load balancing among servers, or a combination of the two. A multipath-aware DNS service can assign multiple IP addresses to servers dynamically, or in real-time, to achieve optimal paths, loads, and/or connections.

That is, where a multipath-aware DNS service assigns another IP address to a server, there is likely to be a new network path to the server, since a network path can be determined based on a hash that takes the server IP address as input. So, by assigning more IP addresses to a server to find an IP address that corresponds to a desired network path, a multipath-aware DNS service can select both a server and a path (in contrast to selecting a server that causes a particular path to be taken), and so select a server to balance loads and/or connections among a plurality of servers.

In some examples, the first network address of the device comprises a first IP address, and the second network address of the application server comprises a second IP address.

After operation 908, process flow 900 moves to operation 910.

Operation 910 depicts sending an indication to the device to access the application server, wherein the device uses the first network path based on using DNS routing to query a path to the first application server. This indication can be a response from a multipath-aware DNS service to a client computer (or device) that indicates an IP address of the selected server of the plurality of application servers. Since the multipath-aware DNS service can have determined the network path to be used with that selected server, the multipath-aware DNS service can send just the server's IP address and not the intended network path. That is, in some examples, the device will route communications to the sever along the selected network path simply because of that server IP address, and not because the multipath-aware DNS service explicitly instructs the device to use that network path.

After operation 910, process flow 900 moves to 912, where process flow 900 ends.

Figure 10:
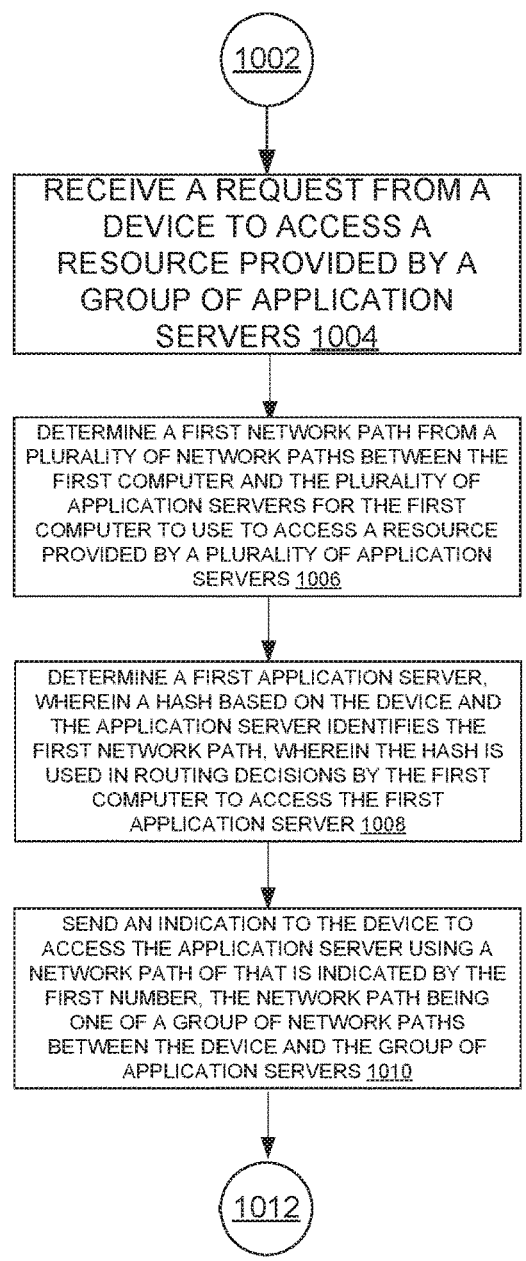
FIG. 10 illustrates another example process flow that can facilitate DNS multipathing distributed applications, in accordance with certain embodiments of this disclosure.

FIG. 10 illustrates another example process flow 1000 that can facilitate DNS multipathing distributed applications, in accordance with certain embodiments of this disclosure. In some examples, aspects of process flow 1000 can be implemented by computing environment 1200 of FIG. 12. In some examples, aspects of process flow 1000 can be used to implement aspects of multipath-aware DNS 108 of FIG. 1.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1100 of FIG. 11.

Process flow 1000 begins with 1002, and moves to operation 1004. Operation 1004 depicts receiving a request from a device to access a resource provided by a group of application servers. In some examples, operation 1004 can be implemented in a similar manner as operation 904 of FIG. 9. After operation 1004, process flow 1000 moves to operation 1006.

Operation 1006 depicts determining a first network path from a plurality of network paths between the first computer and the plurality of application servers for the first computer to use to access a resource provided by a plurality of application servers. In some examples, operation 1006 can be implemented in a similar manner as operation 906 of FIG. 9. After operation 1006, process flow 1000 moves to operation 1008.

Operation 1008 depicts determining a first application server of the plurality of application servers, wherein a hash based on the device and the application server identifies the first network path, wherein the hash is used in routing decisions by the first computer to access the first application server. In some examples, operation 1008 can be implemented in a similar manner as operation 908 of FIG. 9. After operation 1008, process flow 1000 moves to operation 1010.

Operation 1010 depicts sending an indication to the device to access the application server using a network path of that is indicated by the first number, the network path being one of a group of network paths between the device and the group of application servers. In some examples, operation 1010 can be implemented in a similar manner as operation 910 of FIG. 9. After operation 1010, process flow 1000 moves to 1012, where process flow 1000 ends.

Figure 11:
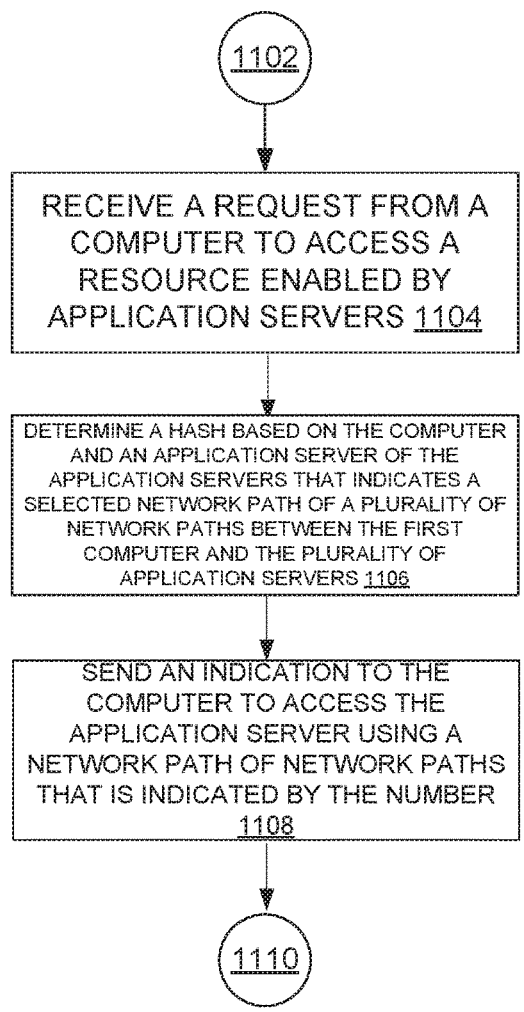
FIG. 11 illustrates another example process flow that can facilitate DNS multipathing distributed applications, in accordance with certain embodiments of this disclosure.

FIG. 11 illustrates another example process flow 1100 that can facilitate DNS multipathing distributed applications, in accordance with certain embodiments of this disclosure. In some examples, aspects of process flow 1100 can be implemented by computing environment 1200 of FIG. 12. In some examples, aspects of process flow 1100 can be used to implement aspects of multipath-aware DNS 108 of FIG. 1.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 1100 begins with 1102, and moves to operation 1104. Operation 1104 depicts receiving a request from a computer to access a resource enabled by application servers. In some examples, operation 1104 can be implemented in a similar manner as operation 904 of FIG. 9. After operation 1104, process flow 1100 moves to operation 1106.

Operation 1106 depicts determining a hash based on the computer and an application server of the application servers that indicates a selected network path of a plurality of network paths between the first computer and the plurality of application servers. In some examples, operation 1106 can be implemented in a similar manner as operation 906 and operation 908 of FIG. 9. After operation 1106, process flow 1100 moves to operation 1108.

Operation 1108 depicts sending an indication to the computer to access the application server using a network path of network paths that is indicated by the number. In some examples, operation 1108 can be implemented in a similar manner as operation 910 of FIG. 9. After operation 1108, process flow 1100 moves to 1110, where process flow 1100 ends.

Example Operating Environment

Figure 12:
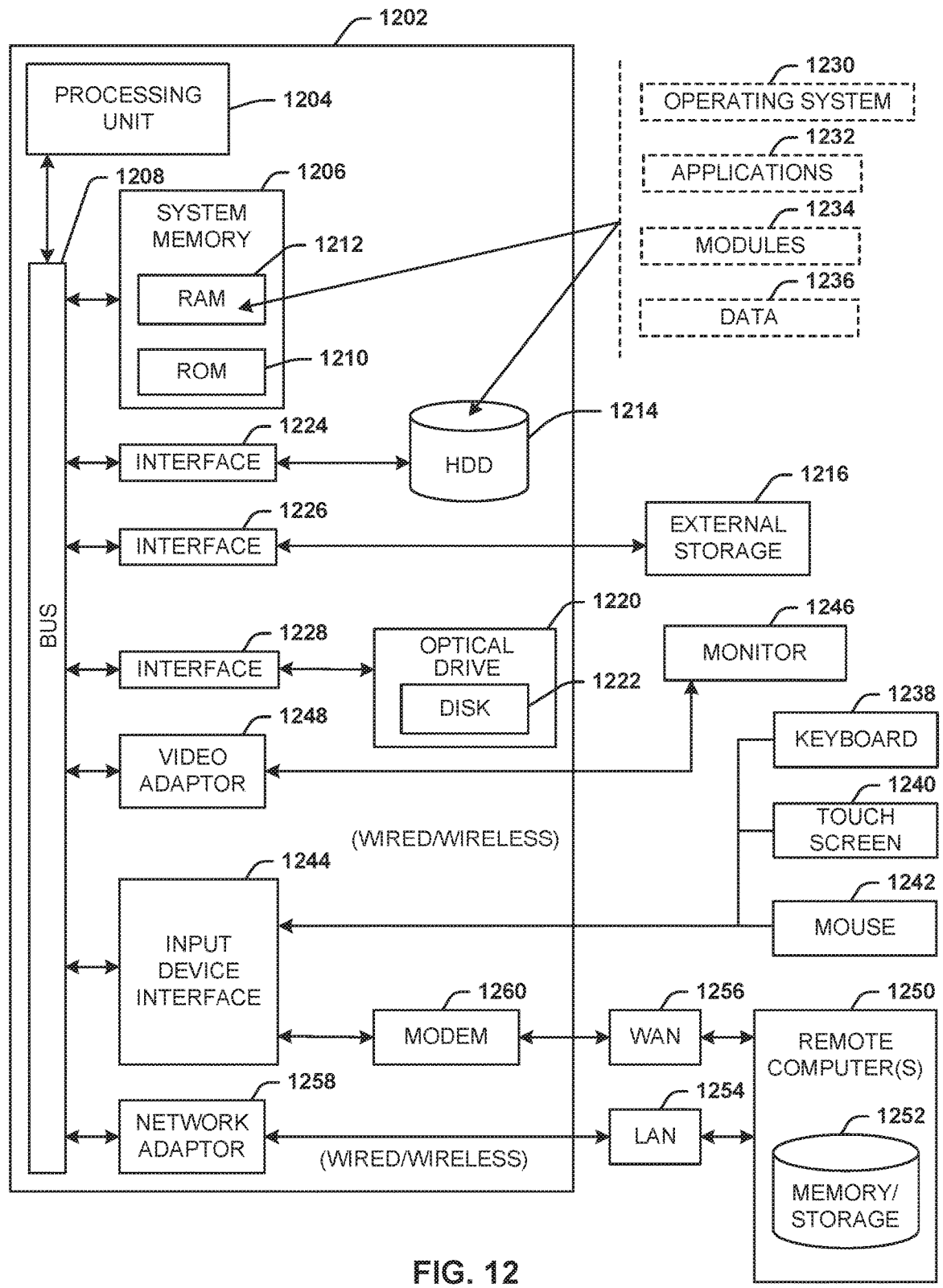
FIG. 12 illustrates an example block diagram of a computer operable to execute certain embodiments of this disclosure.

In order to provide additional context for various embodiments described herein, FIG. 12 and the following discussion are intended to provide a brief, general description of a suitable computing environment 1200 in which the various embodiments of the embodiment described herein can be implemented.

For example, aspects of computing environment 1200 can be used to implement aspects of client computer 102, application servers 106, and/or multipath-aware DNS 108 of FIG. 1. Aspects of computing environment 1200 can be used to implement aspects of client computer 202a-1, client computer 202a-2, server 206a-1, server 206a-2, server 206a-3, client computer 202b-1, client computer 202b-2, server 206b-1, server 206b-2, and/or server 206b-3 of FIG. 2. Aspects of computing environment 1200 can be used to implement aspects of client computer 302a-1, client computer 302a-2, computer 302a-3, server 306a-1, server 306a-2, server 306a-3, server 306a-4, server 306a-5, server 306a-6, client computer 302b-1, client computer 302b-2, computer 302b-3, server 306b-1, server 306b-2, server 306b-3, server 306b-4, server 306b-5, and/or server 306b-6 of FIG. 3. In some examples, computing environment 1200 can implement aspects of the process flows of FIGS. 4-11 to facilitate domain name system multipathing distributed applications.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, a computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving, using a domain name system service, a request from a device to access a resource hosted by application servers, wherein network paths are between the device and the application servers;

selecting a first network path from the network paths for the device to access the resource hosted by the application servers;

after selecting the first network path, determining a first application server of the application servers based on the first network path, for which the device will use the first network path to access the first application server, wherein the determining is based on a result of performing a modulo operation on a hash of a combination of a first network address of the device and a second network address of the first application server, a modulus of the modulo operation being equal to a first number of the network paths, and wherein the hash is determined prior to receiving the request from the device; and sending an indication to the device to access the first application server, wherein the device uses the first network path based on using DNS routing to query a path to the first application server.

2. The system of claim 1, wherein the network paths comprise a link aggregation group.

3. The system of claim 1, wherein the network paths comprise an equal-cost multi-path routing group.

4. The system of claim 1, wherein the network paths comprise a combination of a link aggregation group and an equal-cost multi-path routing group.

5. The system of claim 1, wherein the hash comprises a message-digest hash.

6. The system of claim 1, wherein the hash comprises a secure hash algorithm hash.

7. The system of claim 1, wherein the first network address of the device comprises a first Internet Protocol (IP) address, and wherein the second network address of the first application server comprises a second IP address.

8. The system of claim 1, wherein the hash is based on a communications protocol to be used between the device and the first application server, and wherein the communications protocol is indicated in a fully qualified domain name of the application servers that is indicated by the device.

9. A method, comprising:
receiving, by a system comprising a processor, a request from a device to access a resource provided by a group of application servers;

determining, by the system, a first network path from a plurality of network paths between the device and the group of application servers for the device to use to access the resource;

after determining the first network path, determining, by the system, a first application server of the group of application servers based on the first network path, wherein a hash based on a first network address of the device and a second network address of the first application server identifies the first network path, wherein the hash is used in routing decisions by the device to access the first application server, and wherein the hash is determined prior to receiving the request from the device; and sending, by the system, an indication to the device to access the first application server using the first network path of the plurality of network paths that is indicated by the hash.

10. The method of claim 9, wherein the hash is based on a communications protocol to be used between the device and the first application server.

11. The method of claim 10, wherein the communications protocol is indicated in a fully qualified domain name of the group of application servers that is indicated by the device.

12. The method of claim 9, wherein the hash further comprises a combination of a first network port of the device for communication between the device and the first application server, and a second network port of the first application server for communication between the device and the first application server.

13. The method of claim 9, wherein the determining, by the system, the first network path from the plurality of network paths between the device and the group of application servers is performed based on load balancing among the group of application servers.

14. A non-transitory computer-readable medium comprising instructions that, in response to execution, cause a system comprising a processor to perform operations, comprising:

receiving a request from a computer to access a resource enabled by application servers;

determining a hash based on a first network address of the computer and a second network address of an application server of the application servers that indicates a selected network path of a plurality of network paths between the computer and the application servers, wherein the hash is determined prior to receiving the request from the device;

determining that the application server from the application servers is accessible to the computer via the selected network path; and sending an indication to the computer to access the application server using the selected network path.

15. The non-transitory computer-readable medium of claim 14, wherein the operations further comprise:
determining the application server of the application servers for the computer to use to connect to the application server, based on an output resulting from load balancing among the application servers.

16. The non-transitory computer-readable medium of claim 14, wherein the hash comprises a hashing approach utilized by a domain name system in indicating to the computer which route to take to access the application server.

17. The non-transitory computer-readable medium of claim 14, wherein the determining the hash comprises determining a modulo of the hash, wherein a modulus of the modulo equals a number of servers of the application servers.

18. The non-transitory computer-readable medium of claim 14, wherein each network path of the network paths communicatively couples the computer and the application server.

19. The non-transitory computer-readable medium of claim 14, wherein a first number of the plurality network paths is greater than a second number of network connections of the application servers, and wherein the operations further comprise:
assigning at least one additional IP address to the application servers such that a third number of network connections of the application servers is at least as great as the first number of the plurality of network paths.

20. The non-transitory computer-readable medium of claim 14, wherein the hash is based on a communications protocol to be used between the computer and the application server, and wherein the communications protocol is indicated in a fully qualified domain name of the application servers that is indicated by the computer.

* * * * *